May 7, 1968  G. F. LUTZ  3,381,553

ADJUSTABLE BORING BAR

Filed April 8, 1966

INVENTOR.
GILBERT F. LUTZ
BY Freeman & Taylor
ATTORNEYS

United States Patent Office 3,381,553
Patented May 7, 1968

3,381,553
ADJUSTABLE BORING BAR
Gilbert F. Lutz, Chesterland, Ohio, assignor to The Warner & Swasey Company, Cleveland, Ohio, a corporation of Ohio
Filed Apr. 8, 1966, Ser. No. 541,309
5 Claims. (Cl. 77—58)

ABSTRACT OF THE DISCLOSURE

A bore bar for machining work pieces having a radially opening slot at one end with an elongate cutting element located in said slot. Adjusting means carried by said bar within said slot and adpated to flex the tip of the cutting element radially within said slot for adjustment purposes.

---

Figure 1:
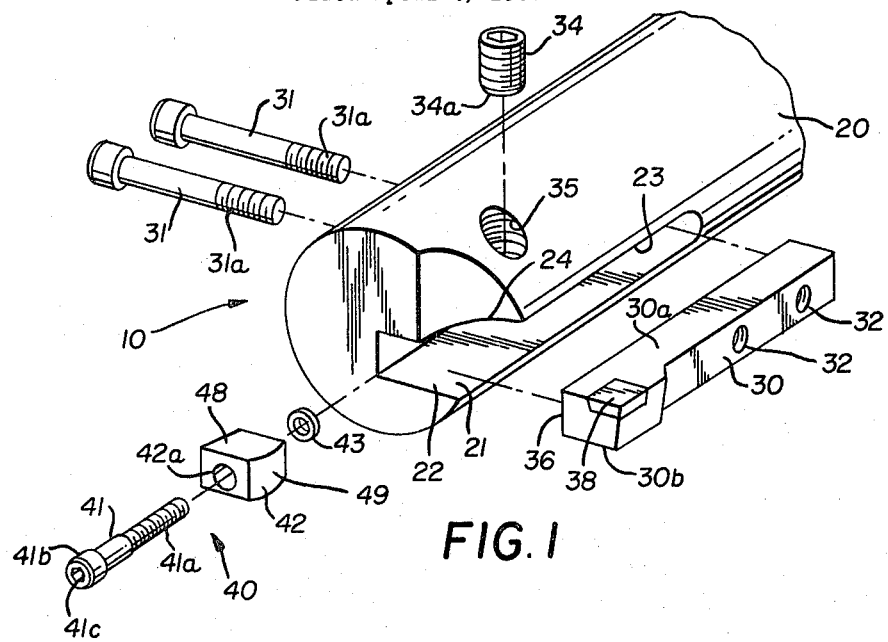

This invention relates to the art of machine tools and more particularly has reference to boring bars wherein the cutting diameter may be effectively adjusted with minimum effort.

In the art of boring bars it has long been known that a rigid bar can be employed to support a radially projecting cutting tip, with the assembly being moved into contact with a rotating work piece so as to effectively machine a circular surface of given diameter.

In this regard it has also long been known to be advantageous to permit a certain degree of adjustment in the diameter of the surface being machined and to this end the prior art reveals many efforts at providing adjustment that will accomplish this objective.

In the main, prior art attempts at providing adjustment have been directed toward construction which permits the cutting portion to be moved along its longitudinal axis to achieve the requisite adjustment.

Obviously, however, such constructions require a loosening, shifting and retightening operation with regard to the cutting tip which precludes, for all practical purposes, the attainment of any predetermined amount of change, with adjustment being more or less on a trial and error basis.

Recent solutions to the problem of providing adjustment have also broadly included the concept of flexing or bending of the cutting tip per se, with such bending serving to achieve the effect of varying the cutting diameter accomplished by the boring bar assembly.

Two patents showing such construction are Yogus et al. United States Patent 2,998,737 and Milewski United States Patent 3,102,441.

It is noted however, that both of the aforementioned patents are characterized by the fact that adjustment in each instance requires the backing off or otherwise loosening of a clamping block or similar element so as to permit flexure of the cutting tip to occur, with retightening or resetting then being additionally necessary following this flexure.

Further, both of the aforementioned patents are characterized by the fact that the same do not effectuate true straight line movement through an imaginary horizontal cutting plane but rather teach movement of the cutting tip upwardly and outwardly with regard to said imaginary horizontal cutting plane. This characteristic obviously precludes the attainment of predetermined measured adjustment with respect to the imaginary horizontal cutting plane since the movement achieved is a compound movement including elements of vertical horizontal travel with respect to the cutting plane.

Finally, the leverage that is applied to the cutting tip for flexing purposes will be seen to remain constant in both of the aforementioned references, with the result that no force advantage is gained as outward adjustment continues.

It has been discovered that the aforementioned disadvantages of the known prior art can be obviated by providing a boring bar that has an expendable cutting cartridge member whose cutting edge can be moved, for adjustment purposes, through an imaginary horizontal cutting plane by flexing the cutting member, so as to provide adjustment of a predetermined amount without the necessity for loosening and subsequently retightening the component parts.

It has been further found that such movement can be best obtained by providing a boring bar that includes a precision machine guide slot that is generally elongate in nature and that opens into the side of the bar so as to permit the radius of the cutting tip to be varied as required.

By use of a slot of this type the opposed walls of the slot in effect serve as a guide to effectuate the straight line flexture that has been previously described above.

In the improved form of the invention shown herein the cutter per se is flexed by the use of a camming element that is carried on an adjustment screw with the camming element serving to flex the cutter as the adjustment screw is moved in or out.

Production of an improved boring bar utilizing the foregoing concepts accordingly becomes the principal object of the invention with other objects of the invention becoming more apparent upon a reading of the following brief specification, considered and interpreted in the light of the accompanying drawings.

Figure 2:
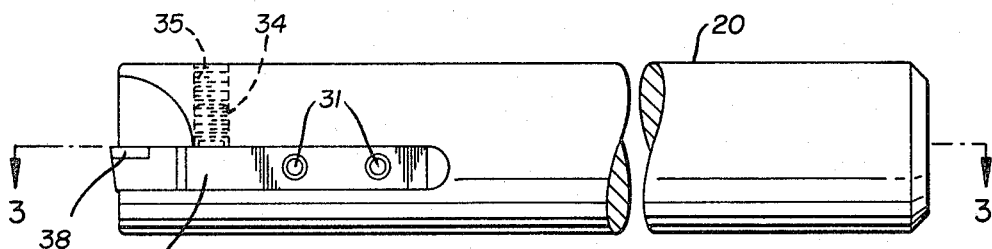
Figure 3:
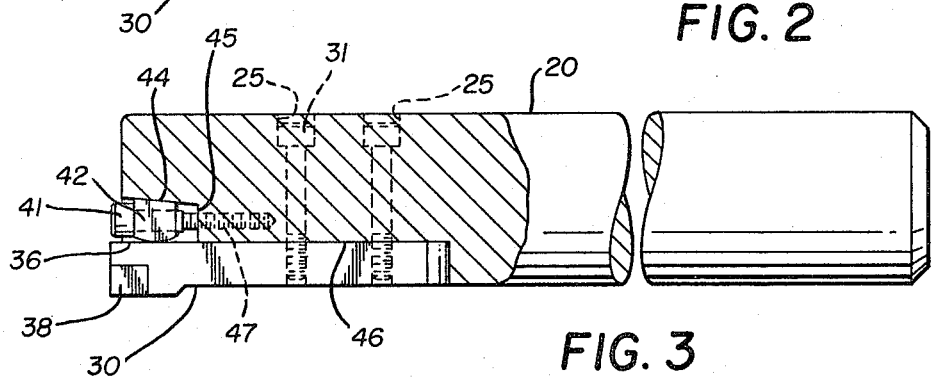
Figure 4:
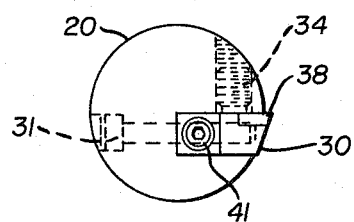

Of the drawings:
FIGURE 1 is an exploded perspective view of the adjustable boring bar.
FIGURE 2 is a side elevation of the adjustable boring bar.
FIGURE 3 is a horizontal sectional view taken on the lines 3—3 of FIGURE 2.
FIGURE 4 is an end elevational view of the adjustable boring bar.

Referring now to the drawings and in particular to FIGURE 1 the adjustable boring bar, generally designated by the numeral 10 includes elongate body member 20 having a guide slot 21 within which may be received a cutting element 30, with screws 31, 31 serving to retain insert 30 within groove 21 while adjustment of the cutter 30 within groove 21 is effectuated by adjustment means 40 as will be presently described.

In this regard and again referring to FIGURE 1, the groove 20 includes parallel planar surfaces 22 and 23 with the surface 23 being cut away in the area 24 for the purpose of providing the usual chip clearance area.

As shown in FIGURES 3 and 4 a pair of counter-bored openings 25, 25 receive the lag bolts 31, 31 with the threaded ends 31a, 31a thereof being provided for reception in the tapped apertures 32, 32 of the cutting member 30.

In this fashion the member 30 can be secured against vibration within the confines of the groove 21 with it being noted that the top surface 30a and the bottom surface 30b of the insert 30 are machined for approximate coplanar engagement with the top and bottom walls 23 and 22 respectively. In this regard it should be noted that a set screw 34 is received within tapped opening 35 for the purpose of bearing lightly against the surface 30a to insure vibration dampening in the event that the insert 30 is slightly undersized with respect to its heighth dimension just described, with screw 34 being provided with the usual dogpoint 34a for the purpose of such engagement.

Turning now to the adjustment means 40 the same include a cap screw 41, cam block 42 and a locking collar 43 with the arrangement being such that the opening 42a of cam block 42 is passed over the threaded portion 41a of cap screw 40 for reception on the shank portion thereof so as to bear against the head 41b as clearly shown in FIGURE 3 of the drawings. The cam block 42 is retained in the just described location by the use of a collar 43 that may be welded in place on the shank of screw 41 as shown in FIGURE 3. Alternatively, a snap ring and groove arrangement could be employed to hold block 42 in place.

Again referring back to the boring bar 20 it will be further noted from FIGURE 3 that the groove 21 further includes, adjacent its outboard end, an inclined wall surface 44 that terminates in a shoulder 45, with shoulder 45 in turn terminating in a main bottom wall 46. Shoulder 45 also defines an inwardly extending bore 47 within which the threaded end 41a may be received.

In this regard and as shown in FIGURE 3, the wall surface 44 is designed to engage a similarly inclined wall 48 that is provided on the cam member 42 with the opposed wall 49 thereof of cam 42 preferably being rounded for line type engagement with the wall surface 36 of cutter 30.

For the purpose of providing adjustment, the clamp screw 41 is provided with the usual hex opening 41c within which a wrench or other turning instrument may be inserted for rotation imparting purposes.

In use or operation of the imrpoved adjustable boring bar it will first be assumed that the component parts have been assembled to the condition shown, wherein the cutter 30 is received within the slot 21 and loosely held in place therein by the threaded engagement between bolts 31, 31 and member 30 as has been previously described.

At this time it will further be assumed that the adjustment means 40 have been assembled with cam block 42 being positioned on the shank portion of the bolt 41 and held in place therein by positioning of the collar 43 thereon as has been previously described.

Following such assembly the adjustment means 40 may be inserted as a unit between the inclined wall 44 and the wall 36 of the cutter 30, by engaging the threaded end 41a thereof within the tapped opening 47 so as to cause initial positioning of unit 40 in the approximate position shown in FIGURE 3.

At this time the inclined surfaces 48 and 44 are frictionally engaged in the nature of inclined blocks, while the rounded surface 49 is in "line type" contact with the rear wall 36 as clearly shown in FIGURE 3.

At this time the bolts 31, 31 may be drawn up tightly and the set screw 34 moved downwardly to minimum pressure engagement with the top surface 30a so as to preclude any chatter or rattling. Similarly a wrench or other turning tool may then be inserted in the opening 41c and rotated until such time as the cam block 42 is snugly engaged with surfaces just described.

It is believed apparent that further rotation of the adjustment screw 41 in a clockwise direction will cause the camming block 42 to move to the right of FIGURE 3 with such movement resulting in an outward flexing of the cutting element 30 to thus effectively change the cutting diameter of the cutting tip 38 that is provided thereon. In the event the diameter is to be reduced it is believed apparent that such adjustment can be made by imparting opposite rotational movement to the adjustment screw 41 with the inherent recovery of the cutting tool per se serving to decrease the diameter in the event this is required.

It will be seen from the foregoing how there has been provided a new and improved boring bar which features straight line adjustment of the cutting member so as to permit micrometric change in the cutting radius of the rotating boring bar.

It has been further shown how the concept of flexing the boring bar by use of an adjustment screw permits a high degree of accuracy to be obtained with regard to the amount of adjustment achieved, with the coaction and sliding arrangement between the cutter and the slot receiving the same insuring guided and accurate movement in this regard.

While a full and complete description has been set forth in accordance with the patent statutes, it is to be understood that the invention is not to be limited to the precise form herein shown. Accordingly, modifications of the invention may be resorted to without departing from the spirit hereof or the scope of the appended claims.

What is claimed is:

1. An adjustable boring bar of the character described, comprising:
   (A) an elongate body having a radially opening slot at one end;
   (B) an elongate cutting element including
      (1) a shank releasably connected to said body,
      (2) a cutting tip
         (a) adapted to be received in said slot
         (b) said tip being movable radially of said slot and being secured against longitudinal movement therein with the cutting edge of said tip projecting forwardly and sidewardly of said body; and
   (C) means positioned between the walls of said slot and varying the depth to which said tip is received within said slot, whereby the cutting diameter of said boring bar can be varied.

2. The device of claim 1 further characterized by the fact that said means include an adjustment screw having a camming block interposed between the bottom wall of said slot and the radially innermost edge of said tip.

3. The device of claim 2 further characterized by the fact that operation of said adjustment screw results in movement of said camming block axially of said body; said axial movement of said camming block resulting in flexure of said cutting tip within said slot and relatively of said body and said shank.

4. The device of claim 3 further characterized by the fact that the distance between the bottom wall of said slot and the radially innermost wall of said tip progressively decreases from the forward end of said boring bar rearwardly, whereby rearward movement of said camming block flexes said tip within said slot in a radially outward direction.

5. An adjustable metal cutting tool of the character described and being adapted to cut a circular dimension in a supported work piece, comprising:
   (A) an elongate tool body having a radially opening slot
   (B) an elongate boring tool
      (1) having parallel sides engaged with the walls of said slot whereby said boring tool is in substantial parallelism with the axis of rotation thereof
      (2) and having a cutting tip disposed in a cutting plane that has been established with respect to said work piece; and
   (C) means within said slot for flexing said tool whereby the tip portion thereof moves linearly between spaced points lying within said cutting plane.

References Cited
UNITED STATES PATENTS

| | | | |
|---|---|---|---|
| 1,127,121 | 2/1915 | Wahlstrom | 77—76 |
| 2,976,774 | 3/1961 | Hess | 77—5.5 |
| 3,172,309 | 3/1965 | Cogsdill | 77—58.1 |

GERALD A. DOST, *Primary Examiner.*